G. H. GARRISON.
ARTIFICIAL BAIT.
APPLICATION FILED DEC. 28, 1908.
974,050.
Patented Oct. 25, 1910.
2 SHEETS—SHEET 1.
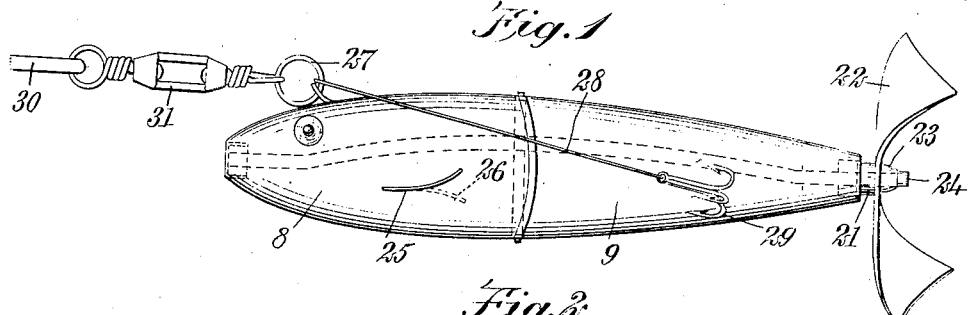
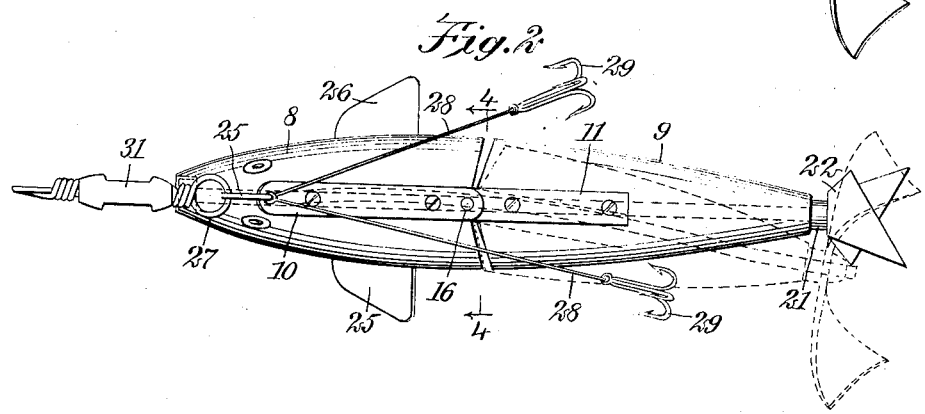
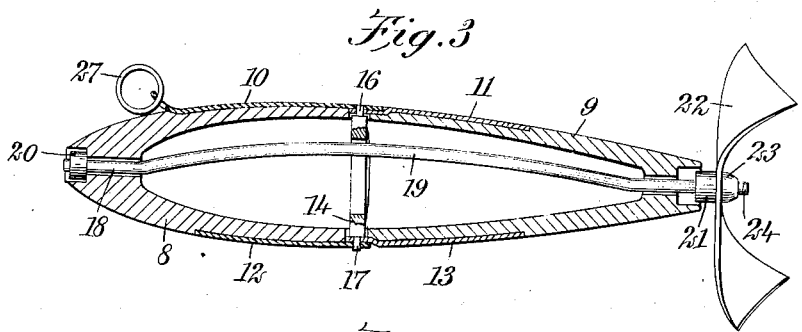
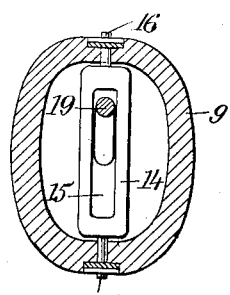
WITNESSES
F. D. Sweet
Walton Harrison
INVENTOR
George H. Garrison
BY Munn & Co
ATTORNEYS

G. H. GARRISON.
ARTIFICIAL BAIT.
APPLICATION FILED DEC. 28, 1908.

974,050.

Patented Oct. 25, 1910.
2 SHEETS—SHEET 2.

WITNESSES
F. D. Sweet
Walton Harrison

INVENTOR
George H. Garrison
BY
ATTORNEYS

UNITED STATES PATENT OFFICE.

GEORGE H. GARRISON, OF OLYMPIA, WASHINGTON.

ARTIFICIAL BAIT.

974,050.  Specification of Letters Patent.  Patented Oct. 25, 1910.

Application filed December 28, 1908. Serial No. 469,568.

*To all whom it may concern:*

Be it known that I, GEORGE H. GARRISON, a citizen of the United States, and a resident of Olympia, in the county of Thurston and State of Washington, have invented a new and Improved Artificial Bait, of which the following is a full, clear, and exact description.

My invention relates to artificial bait of the kind used in fishing, my more particular purpose being to provide a construction of bait having generally the form of a fish or similar animal, and provided with means controllable by the motion of the bait through the water for causing the same to simulate a natural swimming motion.

More particularly stated, my invention comprehends a structure made in imitation of a small fish or the like, and having more or less flexibility, the structure being further provided with mechanism actuated by dragging the bait through the water, for causing the bait to bend back and forth with a rhythmic movement, simulating the motion of a fish swimming through the water.

Reference is to be had to the accompanying drawings forming a part of this specification, in which drawings like characters of reference indicate like parts throughout the views, and in which—

Figure 5:
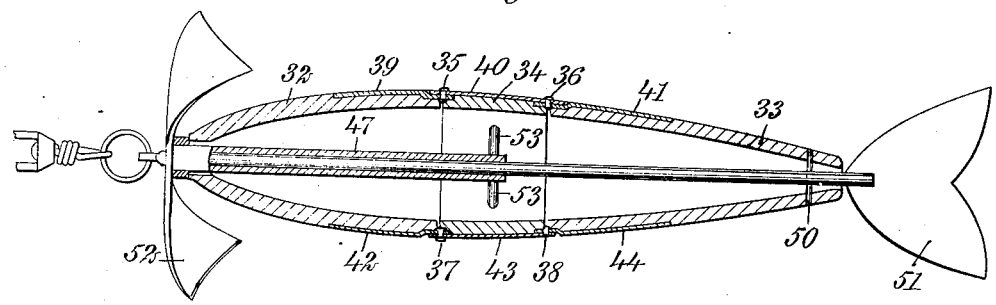
Figure 6:
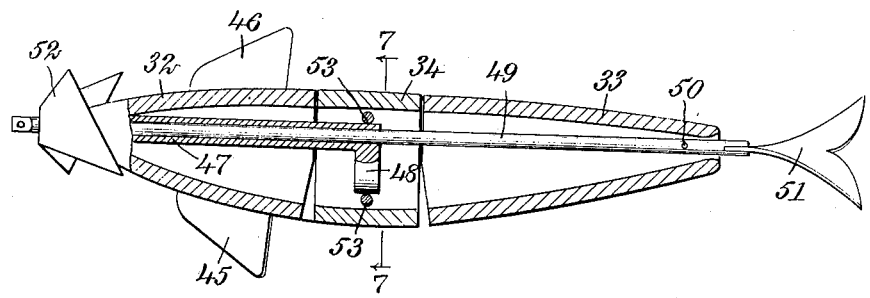
Figure 7:
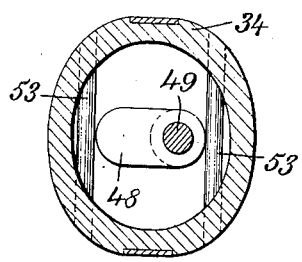

Figure 1 is a side elevation showing one form of my invention, the artificial fish in this instance comprising two principal members journaled relatively to each other, and the device being provided with revoluble blades to simulate the tail of a fish, and mechanism connected with this tail for conferring the aforesaid rhythmic movement to the general structure; Fig. 2 is a plan view of the mechanism shown in Fig. 1; Fig. 3 is a substantially vertical section through the mechanism shown in Figs. 1 and 2, and shows means whereby the rhythmic motion is conferred upon the bait; Fig. 4 is an enlarged section upon the line 4—4 of Fig. 1, looking in the direction of the arrows and showing the yoke and crank constituting a portion of the mechanism for producing the rhythmic movement; Fig. 5 is a substantially central horizontal section through another form of my invention; Fig. 6 is a substantially vertical, longitudinal section through the same; and Fig. 7 is a section upon the line 7—7 of Fig. 6, looking in the direction of the arrows and showing a part of the internal mechanism.

Two frusto-conical members 8, 9 having together a form approximating that of a fish, and made of wood, cork or other material not too heavy for the purpose, are provided with wearing plates 10, 11, 12 and 13. Mounted within the frusto-conical member 9, is a yoke 14 having generally the form indicated in Fig. 4, and provided with a slot 15. The yoke 14 is mounted upon pintles 16, 17 which extend through the overlapping ends of the wearing plates 10, 11, 12 and 13, as will be understood from Fig. 3. A longitudinal shaft 18 is provided with an arcuate portion 19 constituting a crank. The shaft 18 extends entirely through the members 8 and 9 and is provided at one of its ends with a head 20. Mounted upon the opposite end of the shaft 18 is a head 21, which is engaged by a pair of propeller blades 22 made integral with each other, and held in position by aid of a nut 23. This nut is threaded internally and is screwed upon a threaded portion 24 of the rod 18. Two fins 25, 26 are mounted upon opposite sides of the member 8. The fin 25 inclines upwardly at its rear portion, whereas the fin 26 inclines downwardly at its rear portion. The purpose of inclining these fins in the direction indicated is to counteract the tendency of the body of the fish to rotate. The blades 22 are twisted spirally, as will be understood from Figs. 1 and 2, so that when the bait is drawn rapidly through the water the shaft 18 will turn. Since, however, the rotation of the shaft has more or less tendency to cause the body of the fish to rotate, this tendency is neutralized by the pitch given by the fins 25, 26.

At 27 is a ring, and at 28 are snoods to which are connected the hooks 29.

The fishing line is shown at 30, and is preferably provided with a swivel connection 31.

The operation of the device shown in Figs. 1 to 4 inclusive is as follows: The structure being drawn rapidly through the water by aid of the fishing line 30, the vanes or blades 22 turn, causing the shaft 18 to rotate and this produces a rotary motion of the crank 19. As the crank turns, the yoke 14 reciprocates sidewise, as will be understood from Fig. 4, and this causes the artificial bait to bend back and forth upon the pintles 16 and 17, thus producing a simulation of a fish swimming through the water, the body of the fish having a rhythmic motion somewhat similar to that of a real fish.

In the form shown in Figs. 5, 6 and 7, two frusto-conical members 32, 33 are connected together by a central portion 34, all of these parts being connected together by aid of pintles 35, 36, 37 and 38, and bearing plates 39, 40, 41, 42, 43 and 44. The member 32 is further provided with fins 45, 46, the fin 45 being extended obliquely upward and the fin 46 extending obliquely downward. Extending loosely through the frusto-conical member 32, and past the middle of the central portion 34, is a tubular sleeve 47 carrying a crank 48 integral with it. A rod 49 extending through the sleeve 47 and crank 48, as well as through both of the frusto-conical members 32, 33 and the central portion 34, is connected by a pin 50 with the smaller portion of the frusto-conical member 33. A vane 51 is connected rigidly with the rod 49 and is twisted slightly, as is indicated in Fig. 6, constituting a member having more or less resemblance to a fish's tail. Another vane 52 is mounted to the left of the member 32, according to Fig. 5, and is connected rigidly with the sleeve 47. The vane 52 has a suitable pitch for causing the vane, and consequently the sleeve 47, to turn as the structure is drawn through the water. Mounted within the central portion 34 are two rods 53 disposed upon opposite sides of the crank 48.

The operation of my device is as follows: The entire structure being drawn through the water substantially as above described, the vanes 52 rotate and cause the sleeve 47, carrying with it the crank 48, to turn. As the crank 48 rotates it engages the pins 53 alternately (see Fig. 7) thus causing the central portion 34 to move alternately to the right and left according to this figure. This causes the bait to bend back and forth with a rhythmic motion, simulating that of a fish swimming. Since there is more or less undesirable tendency of the entire bait to turn, however, this is compensated for by the twist given the vane 51 representing the fish's tail.

Having thus described my invention, what I claim as new and desire to secure by Letters Patent is:

1. The combination of a flexible body member, a revoluble shaft provided with a crank for bending said flexible body member, and a vane connected with said shaft and having generally the form of a fish's tail, said vane being bent spirally for the purpose of turning said shaft when dragged through the water.

2. The combination of a flexible body member, mechanism including a revoluble vane for periodically bending said flexible body member so as to simulate the motions of an animal in swimming, and fins mounted upon said body member, one of said fins being inclined at a different angle from another for the purpose of offsetting the tendency of said body member as a whole to turn with said vane.

In testimony whereof I have signed my name to this specification in the presence of two subscribing witnesses.

GEORGE H. GARRISON.

Witnesses:
   WALTON HARRISON,
   JOHN P. DAVIS.